Patented May 2, 1933

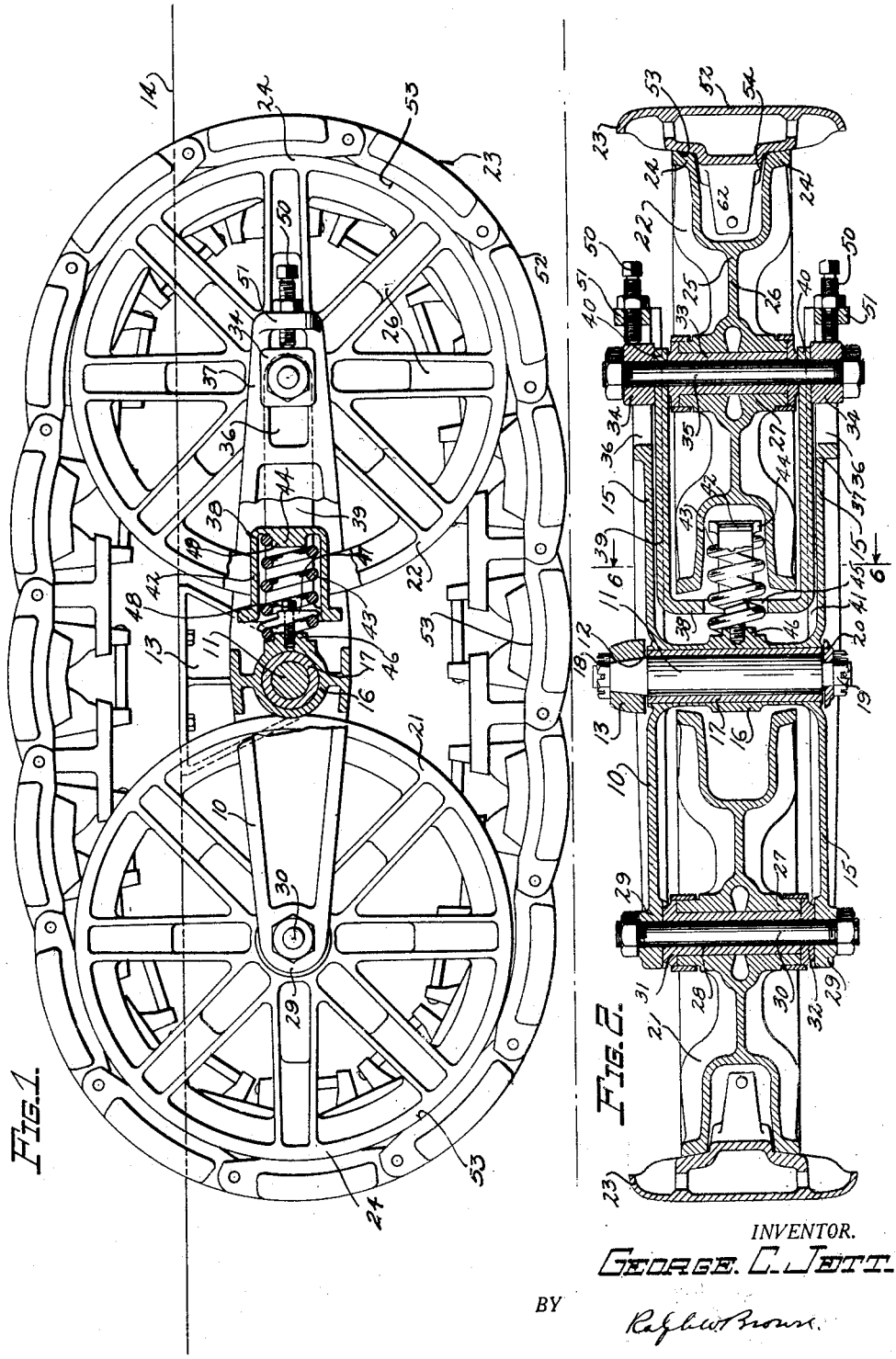

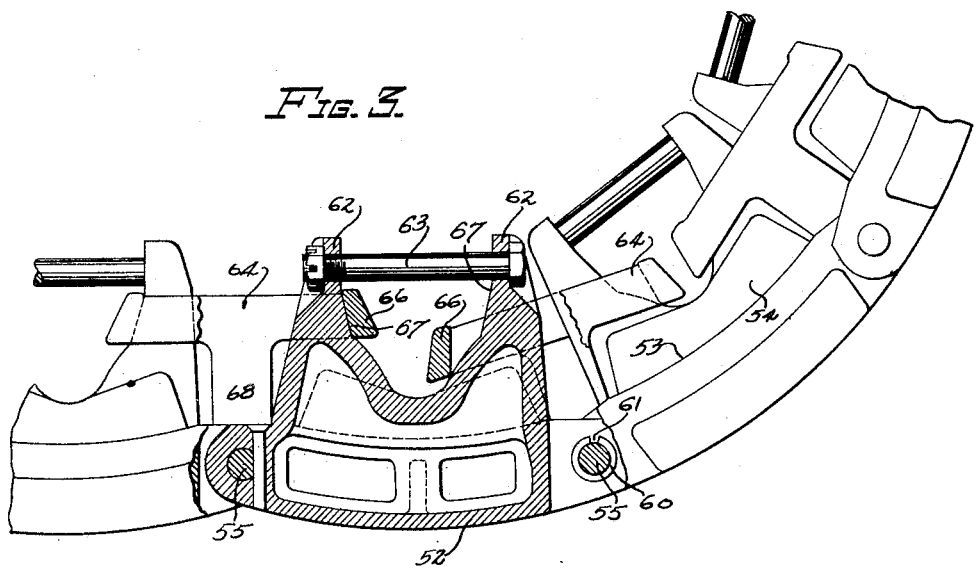
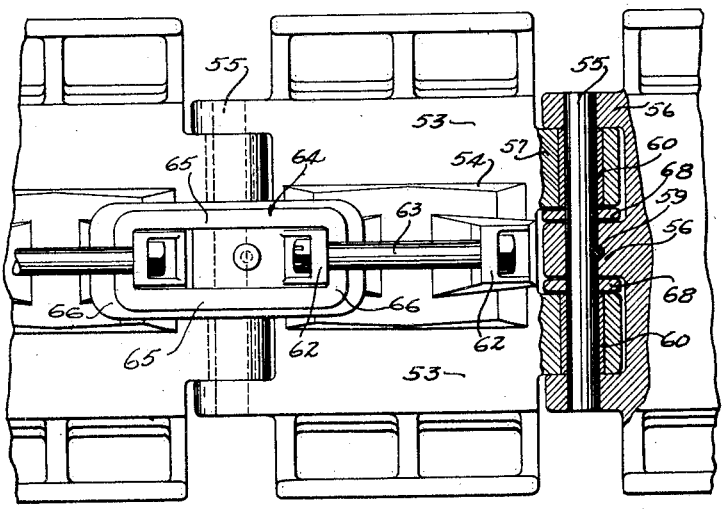
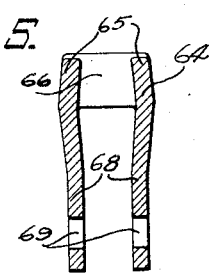

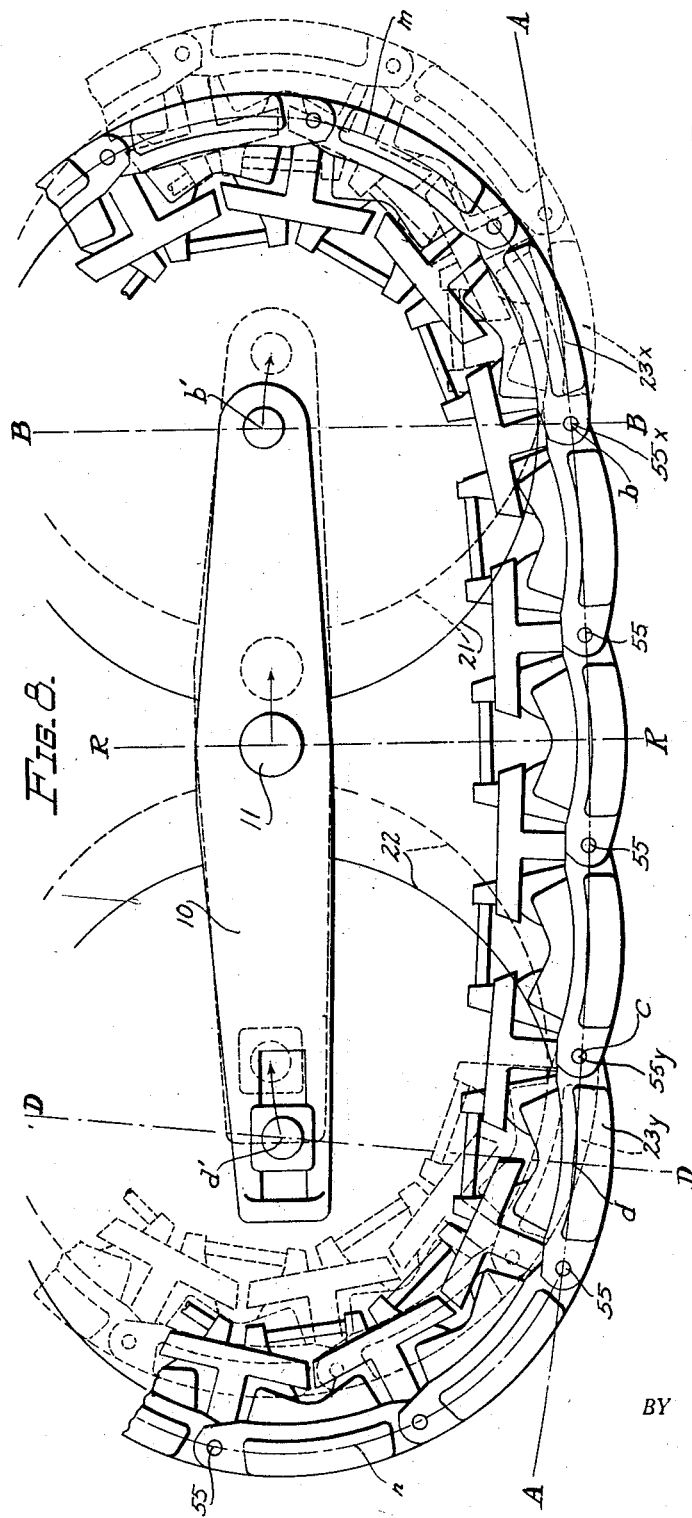

1,906,610

UNITED STATES PATENT OFFICE

GEORGE C. JETT, OF MILWAUKEE, WISCONSIN, ASSIGNOR OF TWO-FIFTHS TO WALTER H. STIEMKE, OF MILWAUKEE, WISCONSIN

CRAWLER TREAD MECHANISM

Application filed June 6, 1928. Serial No. 283,184.

This invention relates to crawler tread mechanisms primarily for use as wheel substitutes for trailer trucks, and to self-sustaining or truss type tread belts therefor.

A crawler tread mechanism, involving a tread belt of the character mentioned, is fully described in my copending application, Serial No. 240,141, filed December 15, 1927. In tread mechanisms of this type the supported load is transmitted to the tread belt solely through the end rollers or tumblers, and as heretofore designed, it has been impossible to avoid a bumpy action as the leading end roller or tumbler passes from shoe to shoe along the tread belt.

In an effort to avoid this bumpy action attempts have been made to maintain sufficient slack in the opposite end loops of the tread belt to permit each shoe to lower into its trussed or load sustaining position before receiving the forward load carrying roller or tumbler and, similarly, to permit each shoe to remain in trussed or load sustaining position until the rear load carrying roller or tumbler leaves the same. This use of a slack belt however is not a satisfactory solution to the problem, because in operation, particularly over soft ground, the slack in the forward end loop disappears due to the drag of the belt on the rollers, with the result that each forward roller or tumbler climbs upwardly upon the successive forward shoes and then falls with each shoe into its trussed position, producing the very action which it is attempted to avoid, and also imposing severe strains and shocks on the belt structure.

One object of the present invention is the provision of a crawler tread mechanism of the character mentioned in which the parts are so constructed and arranged as to avoid transmission of this bumpy action to the supported load.

Another object is the provision in a crawler tread mechanism of resilient means for normally maintaining a definite spacing between the end rollers or tumblers but yieldable upon the intrusion of excessive foreign matter to thereby prevent clogging.

Another object is the provision of a truss type tread belt for crawler tread mechanisms involving hingedly connected shoes designed to closely conform to the peripheries of the end rollers or tumblers.

Another object is the provision of an improved truss type tread belt of high capacity and of rugged, simple and economical design.

Other objects and advantages will appear from the following description of an illustrative embodiment of the present invention.

In the drawings:—

Figure 1 is a view in side elevation, partly in section, of a crawler tread mechanism constructed in accordance with the present invention.

Fig. 2 is a view in horizontal section.

Fig. 3 is a view in side elevation, partly in section, on a larger scale, of a portion of the tread belt shown in Figure 1.

Fig. 4 is a view in plan of the tread belt shown in Figure 3.

Fig. 5 is a detail view in section of one of the truss links.

Fig. 6 is a sectional view taken upon the line 6—6 of Figure 2 with the end roller removed.

Fig. 7 is a view in side elevation of the spring loaded yoke shown in Figures 1, 2 and 6.

Fig. 8 is a fragmentary diagrammatic view of the tread belt and coacting rollers illustrating the action thereof during travel of the tread mechanism.

The crawler tread mechanism shown comprises an auxiliary frame 10 pivotally mounted intermediate its ends upon a horizontal pintle 11, rigidly anchored at one end 12 in an appropriate bracket 13 fixed to the bottom 14 of the vehicle body. In this instance the frame is in the form of a one-piece H-shaped casting having a pair of laterally spaced, substantially parallel, longitudinal members 15, integrally and rigidly connected intermediate their ends by a hollow cross member 16, which contains a bushing 17 fashioned to receive and form a bearing for the pintle 11. The inner end 12 of the pintle is preferably tapered as indicated and threaded to receive a nut 18 by which it may be drawn into a tight wedge fit within the bracket 13, the outer end of the pintle being reduced and threaded to receive a nut 19 and washer 20 to retain the same within the bushing 17 and member 16.

A pair of end rollers or tumblers 21 and 22, mounted at opposite ends of the frame, between the longitudinal members 15, constitute a support and guide for the endless tread belt 23 to be hereinafter described. The rollers shown are substantially the same as those described in my copending application hereinabove identified. Each comprises a pair of spaced parallel rims 24 integrally connected through the forked ends of a series of spokes 26 which project radially from a relatively long hub 27. Roller 21 is journaled upon a bushing 28 which is tightly clamped between the adjacent ends 29 of the members 15 by a shaft 30 in the form of a heavy tie-bolt extended therethrough. An integral flange 31 on one end of the bushing cooperates with a spacer washer 32 at the other end to confine the hub 27 against end play. The other roller 22 is similarly journaled upon a bushing 33 which is clamped between a pair of slide blocks 34 by a shaft 35 in the form of a tie-bolt extended therethrough. Blocks 34 are snugly fitted for adjustment within longitudinal slots 36 formed in the adjacent ends 37 of the longitudinal members 15, so that roller 22 is adjustable toward and from the other roller 22.

Provision is made in the mechanism shown for normally maintaining a definite spacing between the rollers 21 and 22 during normal travel, but permitting the roller 22 to approach the roller 21 upon the intrusion of excessive foreign matter between the tread belt and rollers to thereby prevent clogging. In this instance this is accomplished by the use of a spring pressed yoke 38, disposed within the frame 10 between the roller 22 and cross member 16, and provided with a pair of parallel legs 39 whose forward ends 40 are interposed between the blocks 34 and bushing 33 and are perforated to receive the shaft 35. The legs 39 are guided in appropriate longitudinal channels 41 formed in the longitudinal member 15 of the frame. The yoke is also provided with a substantially U-shaped stirrup 42, which projects forwardly into the space between the rims 24 of roller 22 and provides a support for and partially houses a heavy compression spring 43, interposed between the cross member 16 of the frame and the end 44 of the stirrup. The spring 43 projects through an opening 45 in the yoke and is seated at one end upon a lug 46, projecting from member 12 and preferably grooved to receive the end convolution of the spring, and to which the spring is securely anchored by appropriate means such as a clamp 47 and screw 48. The other end of the spring engages an appropriate centering lug 49 in the stirrup. The arrangement is such that the pressure of the spring 43 is transmitted thru the yoke to the shaft 35 to urge the roller 22 outwardly. A pair of adjusting screws 50, threaded through lugs 51 on the ends of the longitudinal members 15, coacts with the blocks 34 to positively limit the outward movement of the roller, so that a predetermined spacing is normally maintained between the end rollers. The screws 50 are normally so set as to remove all slack from the tread belt without imposing any tension therein. In the event of intrusion of excessive foreign matter between the rollers and tread belt however, the roller 22 may move inwardly against the pressure of the spring 43, to thereby reduce the distance between roller centers and thus provide a slack in the tread belt sufficient to prevent clogging.

The tread belt is of the self-sustaining or truss type and comprises a series of hingedly connected shoes so constructed and arranged as to closely conform to the periphery of the rollers throughout the end loops of the belt and to provide a rigid load sustaining structure spanning the gap between the end rollers. In this instance each shoe is in the form of a hollow casting shaped to provide a relatively broad tread surface 52 for contact with the ground, and a pair of roller engaging surfaces 53 which are separated by an upstanding guide portion 54 for engagement between the parallel rims 24 of the end rollers. Surfaces 53 are curved through the major portion of their length to match the curvature of the rims 24 of the rollers to increase the contact area therebetween and to thereby insure snug contact between the shoes and rollers throughout the end loops of the tread belts; and the surfaces 52 are preferably concentrically curved with respect to the surfaces 53 so as to form a substantially continuous circular surface concentric with respect to the roller centers throughout the end loops of the belt. The several shoes are connected by pivot pins 55 which extend through sets of intermeshing ears 56 and 57 projecting from the adjacent edges of successive shoes. Each pivot pin 55 is fixed in ears 56 of one shoe by appropriate means such as a locking pin 59, and is journaled in bushings 60 seated in the ears 57 of the adjacent shoe. In this instance each bushing 60 is formed from flat material curled into the form indicated and each is held against rotation within the ear by a rib 61 which projects inwardly between the spaced ends of the curled bushing.

In the tread belt shown the hinge action between shoes is limited by means which will now be described. In this instance the guide portion 54 of each shoe merges into a pair of spaced arms 62 which project upwardly therefrom at the ends thereof. The arms 62 of each shoe are preferably braced by a tie rod 63 which extends through and connects the upper ends thereof. The adjacent arms of successive shoes are connected by an embracing link 64. Each link 64 comprises a pair of longitudinal bars 65 integrally connected at opposite ends by cross bars 66, which coact with the inner faces 67 of the arms 62 to limit the hinge action between successive shoes. Each link 64 is preferably supported upon a pair of depending legs 68 perforated as at 69 to receive the pivot pin 55 connecting the associated shoes. By mounting each link 64 in this manner a proper relation is always maintained between these links and arms 62. A limited hinge action between the successive shoes is thus provided by which the tread belt is free to wrap closely about each end roller throughout each end loop of the belt and by which the tread belt forms a rigid load sustaining truss structure spanning the gap between the rollers.

It will of course be understood that throughout the upper and lower runs of the tread belt the ends 66 of each link 64 bear squarely against the inner faces 67 of the arms 62 and the several links 64 are under tension while the several shoes are under compression. The links 64 are preferably so proportioned with respect to the shoe pitch, or distance between the centers of pivot pins 55, that the upper and lower runs of the tread belt assume a slightly cambered convex form. The several pivot pins contained within the lower run of the belt thus lie within the arc A—A of a circle (hereinafter referred to as the "cambered pin circle") having a radius several times that of the rollers 21 and 22.

The operation of the tread mechanism shown will now be described, reference being had particularly to Figure 8. During travel of the tread mechanism from left to right in Figure 8, each of the several shoes contained in the forward end loop of the tread belt remains tightly wrapped about the periphery of the forward roller 21, and each moves as a unit with the roller until it arrives in load sustaining position beneath the roller and ultimately assumes a trussed position with respect to an adjacent shoe and thereby becomes a part of the rigid structure spanning the gap between the rollers. The action of each shoe as it approaches this trussed position is illustrated by the full and dotted line positions of shoe 23x in Figure 8. As therein indicated it swings downwardly about the pivot pin 55x until it reaches the trussed position shown in dotted lines, permitting the roller 21 to swing with it into the lower position shown. Thereafter the roller 21 swings upwardly from the shoe 23x over the next pivot pin and ultimately forces the next shoe downwardly into trussed position.

After leaving the forward roller in the manner described each shoe remains a part of the rigid truss structure spanning the gap between the rollers until it is wrapped upon the rear roller 22 and lifted out of trussed relation with respect to the next adjacent shoe. The full and dotted line positions of shoe 23y illustrate the action of each shoe as it leaves this trussed position. As indicated, it bears firmly against the roller 22 and swings upwardly therewith about the pivot pin 55y from the full line to the dotted line position. As the roller 22 continues to advance it swings downwardly about the pivot pin 55y until seated upon the next shoe.

It will thus be noted that the several shoes engage the rollers 21 and 22 by a pure wrapping and unwrapping action so that rolling friction and consequent wear therebetween is reduced to a minimum. It will also be noted that each roller, in passing from shoe to shoe, swings about each intermediate pivot pin 55 as a center, causing each roller to periodically rise and fall through a definite distance. In order to avoid transmitting this vertical bumpy action to the supported load the distance between roller centers is so proportioned with respect to the shoe pitch that both rollers rise and fall simultaneously in opposite phase. In other words when roller 21 is in lowest position roller 22 is in highest position and vice versa and the truck frame 10 swings as a simple lever upon the pintel 11 without raising or lowering the same. A proper proportioning of the parts for this action may be obtained by the following process.

First lay out the arc A—A representing the cambered pin circle of desired curvature. The radius of this arc is ordinarily about fifteen times the radius of the end rollers. Then erect a radius R—R normal to this arc, and, at a distance from the line R—R of about one-half the desired spacing between roller centers, erect a line B—B parallel to line R—R. The intersection $b$ of line B—B with the arc A—A will represent the center of the pivot pin 55x. Then, having selected the desired shoe pitch, locate a point $c$ on the arc A—A at a distance approximating the desired distance between roller centers and equal to an integral number of shoe pitches from the point $b$. Point $c$ represents the center of pivot pin 55y. Then at a point $d$ on arc A—A at a distance equal to a half shoe pitch from point $c$ erect a line D—D along a radius of arc A—A. Then select a trial point $b'$ upon the line B—B to represent the center of roller 21, and thereafter locate a point $d'$ on the radius line D—D at a distance from point $c$ equal to the distance between points $b$ and $b'$. Point $d'$ then represents a trial center for roller 22. Then lay out the entire tread belt tightly about the rollers 21 and 22, and if an integral number of shoe pitches does not bring the belt to a close, it will be necessary to relocate the points $d'$ and $b'$, in accordance with the above rule, and again lay out the entire tread belt. After repeated trials a closed tread belt will be obtained equal in length to an integral number of shoe pitches and the finally established points $d'$ and $b'$ will represent the correct positions of the roller centers. It will of course be understood that in laying out the tread belt about the rollers 21 and 22 the centers of the several pivot pins within each end loop of the belt will lie in the arc of a circle $m$ or $n$ whose center is the trial point $d'$ or $b'$ and whose radius is equal to the distance between points $b$ and $b'$, and that the centers of the several pivot pins in the upper run of the belt will be in an arc similar to arc A—A and tangent to the end circles $m$ and $n$ just defined. It will also be understood that in some designs the line A—A may be a straight line, (an arc of infinite radius) in which event line D—D would be erected normal to line A—A and consequently parallel to lines R—R and B—B.

Various changes may be made in the embodiment of the invention hereinabove specifically described without departing from or sacrificing any of the advantages of the invention as defined in the appended claims.

I claim:—

1. In a crawler tread mechanism the combination of a load carrying member, a pair of load sustaining rollers, a load transmitting frame connecting said rollers, an endless tread belt trained about said rollers, said tread belt comprising a series of hingedly connected shoes having roller receiving surfaces shaped to match the peripheries of said rollers and coacting with said rollers to effect vertical oscillation thereof, the spacing of said roller centers being so related to the length of said shoes that said roller oscillations occur simultaneously in opposite phase relation, and a load transmitting rockable connection between said member and frame permitting free vertical oscillation of said frame about an axis intermediate said rollers and through which the vertical oscillation of each roller is substantially compensated by that of the other.

2. In a crawler tread mechanism the combination of a pair of load sustaining rollers each having a substantially circular periphery, a series of hingedly connected shoes forming an endless tread belt trained about said rollers, said shoes having roller receiving surfaces curved to match said roller peripheries and coacting with said rollers to effect vertical oscillation thereof, a load transmitting frame connecting said rollers and normally maintaining a definite spacing between the axes of rotation thereof, the distance between the axes of said rollers being so proportioned relative to the spacing between hinge centers of the successive shoes that the said vertical oscillation of said rollers occurs simultaneously but in opposite phase relation, a load carrying member, and a rockable connection between said member and frame permitting vertical oscillation of said frame about an axis intermediate the axes of said rollers.

3. In a crawler tread mechanism the combination of a pair of load sustaining rollers each having a substantially circular periphery, a series of hingedly connected shoes forming an endless tread belt trained about said rollers, means coacting with said shoes to limit the hinge action therebetween and thereby provide a rigid truss structure spanning the space between said rollers, said shoes having roller receiving surfaces curved to match said roller peripheries and coacting with said rollers to effect vertical oscillation thereof, the spacing of said roller centers being so related to the shoe pitch that said roller oscillations occur simultaneously in opposite phase relation, a load transmitting frame connecting said rollers, a load carrying member, and a load transmitting rockable connection between said member and frame permitting free vertical oscillation of said frame about an axis intermediate said rollers.

4. In a crawler tread mechanism the combination of a pair of load sustaining rollers each having a substantially circular periphery, a truss type tread belt trained about said rollers and forming an outwardly cambered truss structure therebetween, said belt comprising a series of hingedly connected shoes having roller receiving surfaces curved to match said roller peripheries and coacting with said rollers to effect vertical oscillation thereof, the spacing of said roller centers being so related to the shoe pitch that said roller oscillations occur simultaneously in opposite phase relation, a load transmitting frame connecting said rollers, a load carrying member, and a load transmitting rockable connection between said member and frame permitting free oscillation of said frame about a horizontal axis intermediate said rollers.

5. In a crawler tread mechanism the combination of a pair of load sustaining rollers having circular peripheries, a series of tread shoes connected to form a truss type tread belt trained about said rollers, said shoes having concave roller receiving surfaces curved to match said roller peripheries, a load transmitting frame connecting said rollers and normally maintaining a definite spacing between the axes of said rollers such that when one of said rollers rests squarely upon the roller receiving surface of one shoe in the trussed position of that shoe the other of said rollers is midway between other successive shoes to thereby effect vertical oscillation of said frame during lengthwise travel of the mechanism, a load carrying member, and a rockable connection between said member and frame for transmitting the load to said frame at a point adjacent the axis of oscillation thereof.

In witness whereof, I hereunto subscribe my name this 2nd day of June, 1928.

GEORGE C. JETT.